(12) United States Patent
Gumaste et al.

(10) Patent No.: US 7,200,332 B2
(45) Date of Patent: Apr. 3, 2007

(54) SYSTEM AND METHOD FOR ASSIGNING TRAFFIC TO WAVELENGTHS IN OPTICAL NETWORKS

(75) Inventors: Ashwin Anil Gumaste, Richardson, TX (US); Susumu Kinoshita, Plano, TX (US); Koji Takeguchi, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 670 days.

(21) Appl. No.: 10/100,616

(22) Filed: Mar. 15, 2002

(65) Prior Publication Data

US 2004/0208560 A1    Oct. 21, 2004

(51) Int. Cl.
*H04J 14/00* (2006.01)
(52) U.S. Cl. ........................................... 398/59
(58) Field of Classification Search ............... 398/2, 398/3, 58, 59, 69–72
See application file for complete search history.

(56) References Cited

U.S. PATENT DOCUMENTS

| | | | | |
|---|---|---|---|---|
| 4,759,011 A * | 7/1988 | Hicks, Jr. | .................... | 398/60 |
| 5,446,828 A | 8/1995 | Woodall | ..................... | 395/23 |
| 5,510,920 A | 4/1996 | Ota | ............................ | 359/121 |
| 5,786,916 A | 7/1998 | Okayama et al. | ........... | 359/128 |
| 5,790,285 A | 8/1998 | Mock | ........................ | 359/110 |
| 5,949,563 A | 9/1999 | Takada | ....................... | 359/124 |
| 5,999,288 A | 12/1999 | Ellinas et al. | ............... | 359/119 |
| 6,111,673 A | 8/2000 | Chang et al. | ................ | 359/123 |
| 6,115,156 A | 9/2000 | Otani et al. | ................. | 359/124 |
| 6,160,648 A | 12/2000 | Oberg et al. | ................ | 359/110 |
| 6,172,801 B1 | 1/2001 | Takeda et al. | .............. | 359/337 |
| 6,192,172 B1 | 2/2001 | Fatehi et al. | .................. | 385/17 |
| 6,192,173 B1 | 2/2001 | Solheim et al. | ............... | 385/24 |
| 6,226,111 B1 | 5/2001 | Chang et al. | ............... | 359/119 |
| 6,288,834 B1 | 9/2001 | Sugaya et al. | ........... | 359/341.1 |
| 6,438,286 B1 * | 8/2002 | Duerksen et al. | ............. | 385/24 |
| 6,782,198 B1 * | 8/2004 | Liu | .............................. | 398/3 |
| 2002/0003639 A1 * | 1/2002 | Arecco et al. | .............. | 359/119 |

(Continued)

FOREIGN PATENT DOCUMENTS

EP          0 684 713 A2      5/1999

(Continued)

OTHER PUBLICATIONS

Grenfeldt, "ERION-Ericsson optical networking using WDM technology," Ericsson Review No. 3, pp. 132-137, 1998.

(Continued)

*Primary Examiner*—Jason Chan
*Assistant Examiner*—David Lee
(74) *Attorney, Agent, or Firm*—Baker Botts L.L.P.

(57) ABSTRACT

A system and method for assigning a traffic channel to a wavelength in a multi-ring optical network having bifurcated work and protect wavelengths includes determining a transport direction for the traffic channel in a ring of the multi-ring optical network. An inter/intra ring type of the traffic channel is determined. The traffic channel is assigned to a wavelength in the ring based on the transport direction and the inter/intra ring type of the traffic channel. In a particular embodiment, the traffic channel may be assigned to one of an odd and even wavelength based on the transport direction and one of a high and low wavelength based on the inter/intra ring type.

12 Claims, 4 Drawing Sheets

U.S. PATENT DOCUMENTS

2002/0064166 A1* 5/2002 Suetsugu et al. ............ 370/403
2004/0208559 A1* 10/2004 Krishnaswamy et al. ..... 398/59

FOREIGN PATENT DOCUMENTS

WO     WO 99/39470     2/1998
WO     WO 01/47164     6/2001

OTHER PUBLICATIONS

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1-4, Feb. 22, 2002.

M. Karol, "Optical Interconnection Using Shuffle Net Multihop Networks in Multi-Connected Ring Topologies," AT&T Bell Laboratories, Holmdel, NJ 07733, copyright 1988, 10 pages.

K. Aly, "Conflict-free Channel Assignment for an Optical Cluster-based Shuffle Network Configuration," Dept. Electrical & Computer Engineering, University of Central Florida, SIGCOMM 94-8/94 London England UK, copyright 1994, 10 pages.

R. Ramaswami et al., "Routing and Wavelength Assignment in All-Optical Networks," *IEEE/ACM Transactions on Networking*, vol. 3, No. 5, Oct. 1995, 12 pages.

R. Ramaswami et al., "Design of Logical Topologies for Wavelength-Routed Optical Networks," *IEEE Journal on Selected Areas in Communications*, vol. 14, No. 5, Jun. 1996, 12 pages.

G. Li et al., "On the Wavelength Assignment Problem in Multifiber WDM Star and Ring Networks," *IEEE/ACM Transactions on Networking*, vol. 9, No. 1, Feb. 2001, 9 pages.

X. Zhang et al., "An Effective and Comprehensive Approach for Traffic Grooming and Wavelength Assignment in SONET/WDM Rings," *IEEE/ACM Transactions on Networking*, vol. 8, No. 5, Oct. 2000, 10 pages.

* cited by examiner

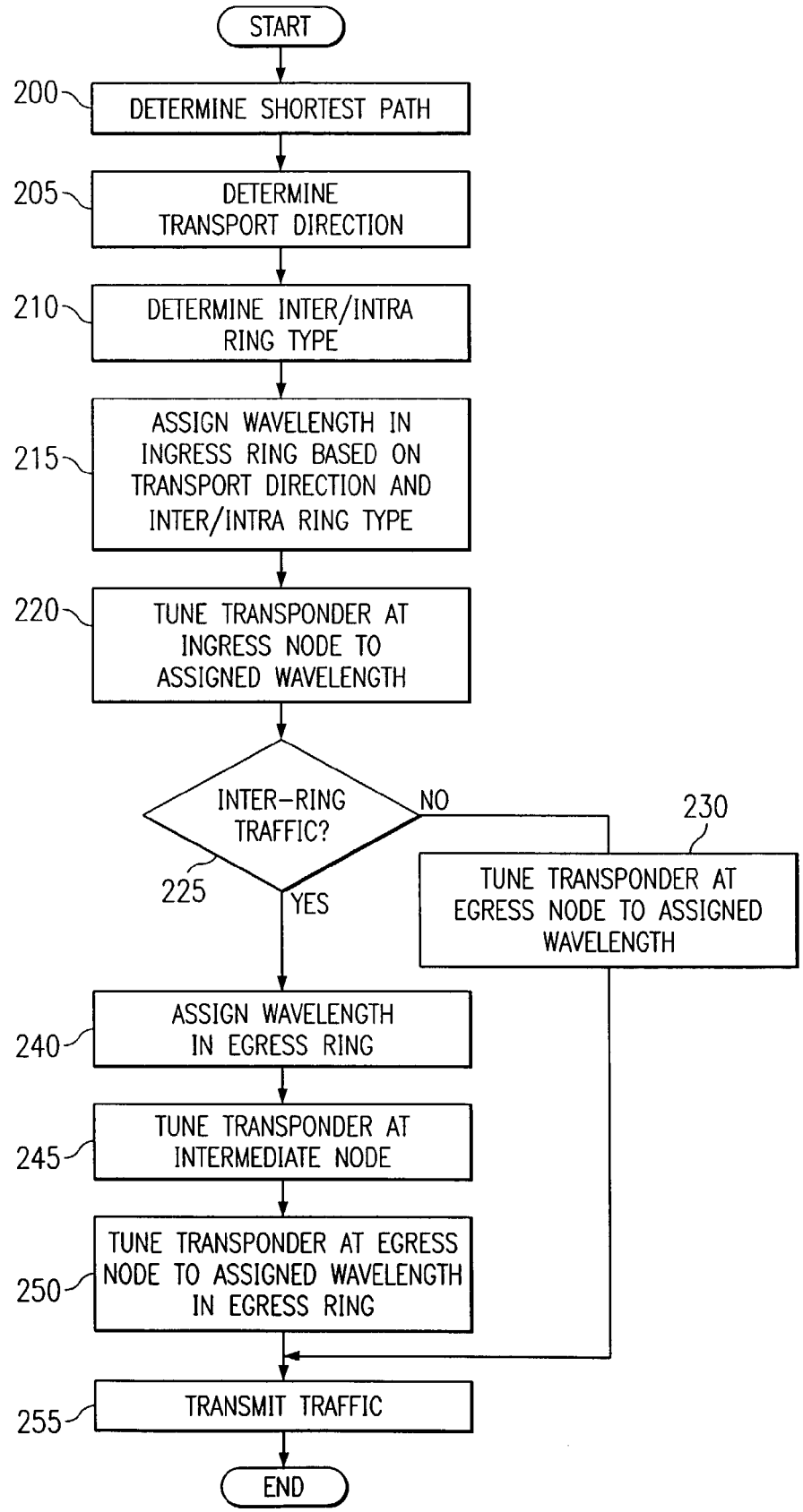

SYSTEM AND METHOD FOR ASSIGNING TRAFFIC TO WAVELENGTHS IN OPTICAL NETWORKS

TECHNICAL FIELD

The present invention relates generally to communication networks and, more particularly, to a system and method for assigning traffic to wavelengths in optical networks.

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting the signals over long distances with very little loss.

Optical networks often employ wavelength division multiplexing (WDM) or dense wavelength division multiplexing (DWDM) to increase transmissions capacity. In WDM and DWDM networks, a number of optical channels are carried in each fiber at disparate wavelengths. Maximum network capacity is based on the number of wavelengths, or channels, in each fiber and the bandwidth, or size of the channels.

For metropolitan area networks, DWDM metro rings are the standard optical transport topology. A number of optical rings can be scaled together by interconnecting the rings at discrete nodes. When a lightpath is provisioned from an ingress node to an egress node, the data is transmitted and received at the ends by a corresponding pair of transponder cards. The transponder cards convert data signals between the optical network domain and an electrical client domain. Transponder cards also tune incoming client signals into an ITU-T specification wavelength. Transponder cards are generally optical-electrical-optical based wavelength readmitters. Transponder cards can cover partial operating bands.

SUMMARY

The present invention provides a system and method for assigning traffic to wavelengths in optical networks. In a particular embodiment, bifurcated traffic and channel assignment is provided for interconnected metro or other suitable optical rings.

In accordance with one embodiment of the present invention, a method and system for assigning a traffic channel to a wavelength in a multi-ring optical network having bifurcated work and protect wavelengths includes determining a transport direction for the traffic channel in a ring of the multi-ring optical network. An inter/intra ring type of the traffic channel is determined. The traffic channel is assigned to a wavelength in the ring based on the transport direction and the inter/intra ring type of the traffic channel.

More specifically, in accordance with a particular embodiment of the present invention, the traffic channel may be assigned to one of an odd and even wavelength based on the transport direction for shortest path. In this and other embodiments, the traffic channel may be assigned to one of a high and low wavelength based on the inter/intra ring type. For example, the traffic channel may be assigned to a lowest available odd wavelength in response to at least determining the traffic channel comprises intra-ring traffic with a clockwise transport direction for shortest path. The traffic channel may be assigned to a lowest available even wavelength in response to at least determining the traffic channel comprises intra-ring traffic with a counterclockwise transport direction for shortest path. The traffic channel may be assigned to a highest available odd wavelength in response to at least determining the traffic channel comprises inter-ring traffic with a clockwise transport direction for shortest path. The traffic channel may be assigned to a highest available even wavelength in response to at least determining the traffic channel comprises inter-ring traffic with a counterclockwise transport direction for shortest path.

Technical advantages of the present invention include providing an improved system and method for assigning traffic to wavelengths in a multi-ring optical network. In one embodiment, the present invention uses a bifurcated wavelength assignment and a bifurcated traffic assignment scheme, thereby establishing lightpaths with a minimum or otherwise reduced fixed number of transponder cards. In this and other embodiments, the invention allows predicting the number and type of transponder cards needed to establish lightpaths for a given quantity of inter-ring and intra ring traffic irrespective of whether the traffic is uniformly distributed or partisan, including predicting the number and kind of transponder cards at ingress, intermediate, and egress nodes for a bounded traffic requirement. In a particular embodiment, for inter-ring traffic an ingress node includes a transponder card corresponding to one wavelength plus the cumulative intra-ring traffic, an intermediate node includes a card corresponding to one wavelength plus the cumulative inter-ring traffic, and an egress node includes a wideband receiver. As a result, the raw stock of transponders needed by service provides to recuperate inter-ring traffic is reduced. Employing the bifurcation of wavelengths and traffic assignment of the present invention may save up to twenty percent of the total kind of cards in the entire network for moderately heavy loads, for example, between 0.3 and 0.7.

Another technical advantage includes providing an improved method for routing and wavelength assignment (RWA). In one embodiment, the present invention combines both the issues of routing as well as wavelength assignment and position into an algorithm that minimizes the various cost functions involved as well as the processing and assignment time needed to calculate these various cost functions.

Still another technical advantage includes bifurcation of the wavelength pool in connection with channel assignment. In particular, the wavelength pool is divided into discrete sets, allowing equal access for a particular transponder card to both a clockwise (CW) and a counterclockwise (CCW) transport directions of the ring. This approach enables the lightpath formed to be the shortest in distance and reduces the overall link-utilization, thereby reducing congestion and reducing or avoiding blocking. In a particular embodiment, a transponder card of four-wavelength tunability may emit two wavelengths in the CW direction and two in the CCW direction, covering the entire ring in shortest paths. In this embodiment, the pool of available wavelengths may be bifurcated into odd and even sets, with odd channels in a first fiber corresponding to protection and even channels of the first fiber corresponding to work. Odd channels in a second fiber correspond to work and even channels to protection.

Still another technical advantage includes improved bifurcation of traffic in an optical ring in connection with channel assignment. In particular, traffic may be bifurcated into two types of traffic, inter-ring and intra-ring traffic. Lightpaths originating and ending within the same ring—intra-ring traffic—may be assigned wavelengths in ascending order, beginning with the first available wavelength. Lightpaths originating at interconnecting nodes from other rings to a node on the present ring—inter-ring traffic—may be assigned wavelengths in descending order, beginning with the first available wavelength. Thus, the intra-ring and inter-ring traffic is isolated, and lightpath blocking may be decreased.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 5 is a flow diagram illustrating a method for assigning traffic in an optical network in accordance with one embodiment of the present invention.

DETAILED DESCRIPTION

Figure 1:
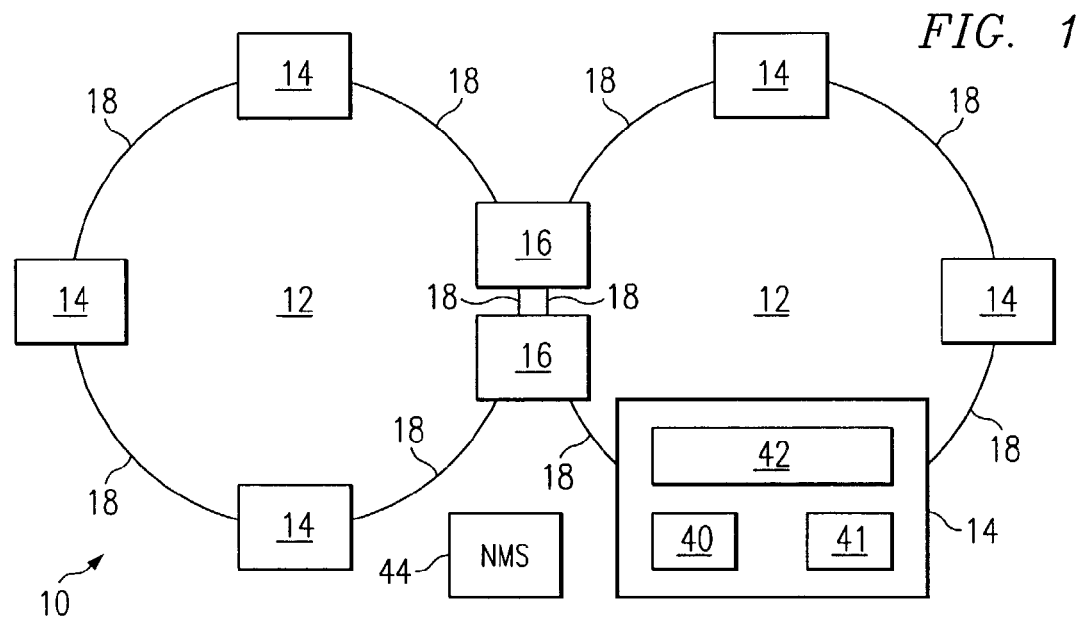
FIG. 1 is a block diagram illustrating an optical communication system in accordance with one embodiment of the present invention.

FIG. 1 is an optical communications system 10 in accordance with one embodiment of the present invention. In this embodiment, the optical communications system is a multi-ring network with two rings 12. It will be understood that alternative embodiments may include any suitable number of interconnected rings in accordance with the network configuration.

Referring to FIG. 1, each ring 12 includes a plurality of network nodes 14 and one or more interconnecting, or common, nodes 16. Network nodes 14 and interconnecting nodes 16 are connected to and communicate with external communication networks or clients to transport traffic for the clients. In one embodiment, the multi-ring network is a metro access or metro core network. Optical traffic over the network may be transmitted and received using Dense Wavelength Division Multiplexing (DWDM) or other suitable wavelength multiplexing technique. In the DWDM embodiment, optical traffic over the network may utilize the C-band (1529 nm to 1565 nm) or other suitable communications band or set of wavelengths. It will be understood that the rings 12 may form or form part of any suitable network and may be directly or indirectly interconnected.

Network nodes 14 and interconnecting nodes 16 may comprise any suitable network element operable to receive, transmit, and/or control optical traffic in the connected rings 12. Each of network nodes 14 and interconnecting nodes 16 may include a plurality of transponders 40, a plurality of receivers 41, and an add/drop module 42. As used throughout, each means all of a particular subset. Transponders 40 may comprise tunable lasers, or other suitable devices operable to receive a data signal and generate an optical signal at a specified wavelength. The data signal may be in an electrical, optical, or other suitable form. Transponders 40 may be tunable to four wavelengths, eight wavelengths, ten wavelengths, or other suitable tunability and may be tunable to wavelengths in the C-band, or other suitable spectrum. In an exemplary embodiment, approximately 12 different types of transponder cards may be employed to cover an entire operating C-band (1529NM to 1565NM). That is, twelve transponder cards of transponders 40 tunable to a particular subset of the particular wavelengths of the C-band may be employed. Moreover, one or more transponder cards 40 may be employed at, for example, interconnecting nodes 16, where a large number of wavelengths are in use in the network. The number of transponder cards 40 employed at each node is proportional to the cumulative add-drop traffic of the network.

Receivers 41 may comprise any suitable network element operable to receive, separate and decode optical signals, either optically or electrically, and may comprise a Wavelength Division Multiplexing (WDM) de-multiplexer, broad band, narrow band, or other suitable device. Add/drop modules 42 may comprise multiplexers, de-multiplexers, switches, passive couplers or other devices suitable to add and drop traffic to and from the ring.

In the rings 12, the nodes 14 and 16 are connected by optical links 18. Optical links 18 may include single, bi-directional fibers, a pair of uni-directional fibers, or other suitable optical fibers or links. The optical fiber may be constructed of glass, a liquid core in a plastic casing, or otherwise suitably constructed to transmit optical signals. One or more optical amplifiers may be distributed along the one or more spans of optical fiber. Optical amplifiers may be located between nodes, at nodes, or otherwise suitably distributed throughout the optical communication network.

The optical communication system 10 also includes a network management system 44. Network management system 44 is operable to communicate with various network components and to provide control signals to the various network components. In one embodiment, each node includes an element management system (EMS) that communicates with every other EMS in the network and with NMS 44 over an optical supervisory channel (OSC). NMS 44 may also include an EMS, which communicates with each other EMS in the network.

Network management system 44 may comprise hardware, software, logic encoded in media or be otherwise suitably constructed. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media or other suitable media in which logic may be encoded and utilized.

In operation, a traffic channel is requested. As described in more detail below, NMS 44 may determine the shortest path for each traffic channel, the work/protect type, and inter/intra ring type and may assign a wavelength to the channel in one or more of the rings. Traffic is routed to a destination node, which may be in the same ring or another ring. Traffic that travels from one ring to another ring is "inter-ring" traffic, traffic that travels between nodes on a single ring is "intra-ring" traffic.

Figure 2:
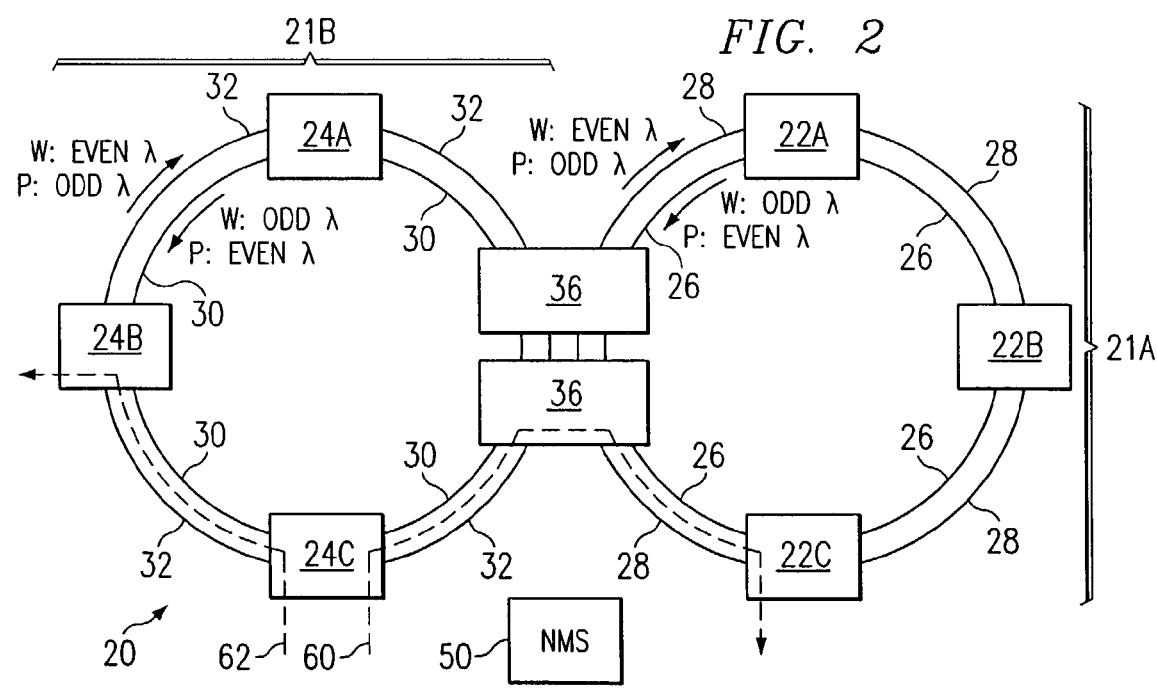
FIG. 2 is a block diagram illustrating exemplary inter-ring and intra-ring traffic in the optical communication system of FIG. 1 in accordance with one embodiment of the present invention.

FIG. 2 illustrates details of a particular embodiment of optical communications system 10 in a two-fiber, two-ring configuration. Optical communications system 20 includes a first ring 21A and a second ring 21B interconnected by a pair of interconnecting or inter-ring nodes 36. First ring 21A includes, in an exemplary configuration, three arbitrary network nodes 22A, 22B, and 22C. Second ring 21B includes, also in an exemplary configuration, three arbitrary network nodes 24A, 24B, and 24C. Network nodes 22A, 22B, and 22C are interconnected by a first fiber 26 and a second fiber 28 connecting the network nodes 22A, 22B, 22C in a ring structure coupled to inter-ring nodes 36. Network nodes 24A, 24B, and 24C are similarly coupled to a first fiber 30 and a second fiber 32, interconnecting network nodes 24A, 24B, and 24C in a ring configuration coupled to inter-ring nodes 36. Optical communication system 20 also includes a network management system 50.

The pool of wavelength channels is bifurcated into work and protect groups. As used herein, bifurcated means separated into two or more discrete subsets, which includes interleaved subsets, division into subsets with equal members, or otherwise suitably separated. In a particular embodiment, wavelength assignments for each of the lightpaths are bifurcated into even and odd groups. Odd channels in the first fiber may be designated as protection channels and even channels in the first fiber may be designated as work channels. Conversely, odd channels in the second fiber may be designated as work channels and even channels in the second fiber may be designated as protection channels.

For example, in a forty channel (forty wavelength) operating band, operating in exemplary network ring 21A, first fiber 26 may be assigned to operate in a clockwise direction, with odd channels (1, 3, 5, . . . ) designated as protective channels and even channels (2, 4, 6, . . . ) designated as working channels. That is, the odd channels in first fiber 26 remain idle, or transmit low priority traffic that can be dropped. Upon a fiber cut or other network malfunction that renders the even, working, channels unable to transmit information or otherwise process optical signals, the channels are transmitted in the odd channels with any low priority traffic being dropped. Similarly, second fiber 28 of first ring 21A may operate in a counterclockwise direction, with odd channels designated as working channel and even channels designated as protection channels.

In addition to bifurcating the pool of wavelength channels, traffic is also be bifurcated into inter-ring traffic and intra-ring traffic. Inter-ring traffic, for example, traffic with an ingress node 14 in second ring 21B and an egress node in first ring 21A, is allocated to descending order wavelengths or channels in the egress ring, in this case first ring 21B. Thus, an optical signal carrying information transmitted from originating network node 24C may be assigned to the first available odd wavelength on, for example first fiber 30 in a descending order; that is, the highest numbered unused wavelength.

Intra-ring traffic, for example traffic with an ingress and egress node in the second ring 21B, is allocated wavelengths in ascending order within the ring. Thus, traffic originating from node 24C would travel along second fiber 32 using the first available even wavelength within second ring 21B. Thus, inter-ring traffic is generally assigned to high wavelengths, where high means at an upper end of a selected spectrum, and intra-ring traffic is generally assigned to low wavelengths, where low means at a low end of a selected spectrum.

By assigning inter-ring traffic in descending order and intra-ring traffic in ascending order, lightpath blocking may be minimized or otherwise reduced and transponder cards may be positioned in ascending order at the peripheral nodes on the ring (e.g., network nodes 22A, 22B, and 22C). Higher numbered, descending cards may be used on the interconnecting nodes, that is, inter-ring nodes 36.

In an exemplary inter-ring transmission from network node 24C to network node 22C an optical signal 60 may be transmitted from network node 24C along fiber 30 with odd wavelength to inter-ring node 36. From inter-ring node 36, the optical signal may travel to network node 22C along fiber 26 with an odd wavelength. In an exemplary intra-ring transmission from network node 24C to network node 24B, an optical signal 62 may travel from network node 24C along fiber 32 at an even wavelength to network node 24B.

Figure 3:
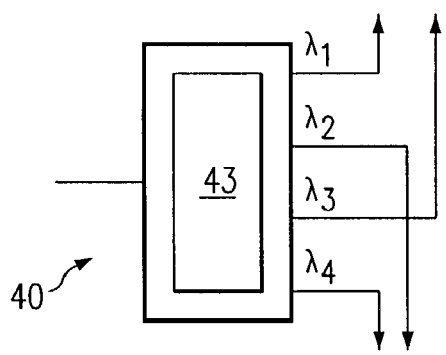
FIG. 3 is a block diagram illustrating the transponder card of FIG. 1 in accordance with one embodiment of the present invention.

FIG. 3 illustrates the transponder card 40 of FIG. 1 in accordance with one embodiment of the present invention. As illustrated, transponder card 40 includes tunable laser 43, operable to transmit an optical signal at a particular tunable wavelength. Tunable laser 43 may be operable to transmit optical signals at four discrete wavelengths, eight discrete wavelengths, ten discrete wavelengths, or otherwise suitably constructed in accordance with the particular network configuration. In one embodiment, a ten wavelength transponder card 40 may be used to minimize or reduce transponder stock in the network.

In the illustrated embodiment, tunable laser 43 is configured to transmit at wavelength $\lambda_1$ and $\lambda_3$ in one direction and $\lambda_2$ and $\lambda_4$ in an opposite direction along the ring. Thus, channels 1 and 3 may be transmitted along, for example, the clockwise direction, while channels 2 and 4 may be transmitted in the counterclockwise direction. Thus, the transponder card 40 has access to the shortest path in each direction of a ring.

Figure 4:
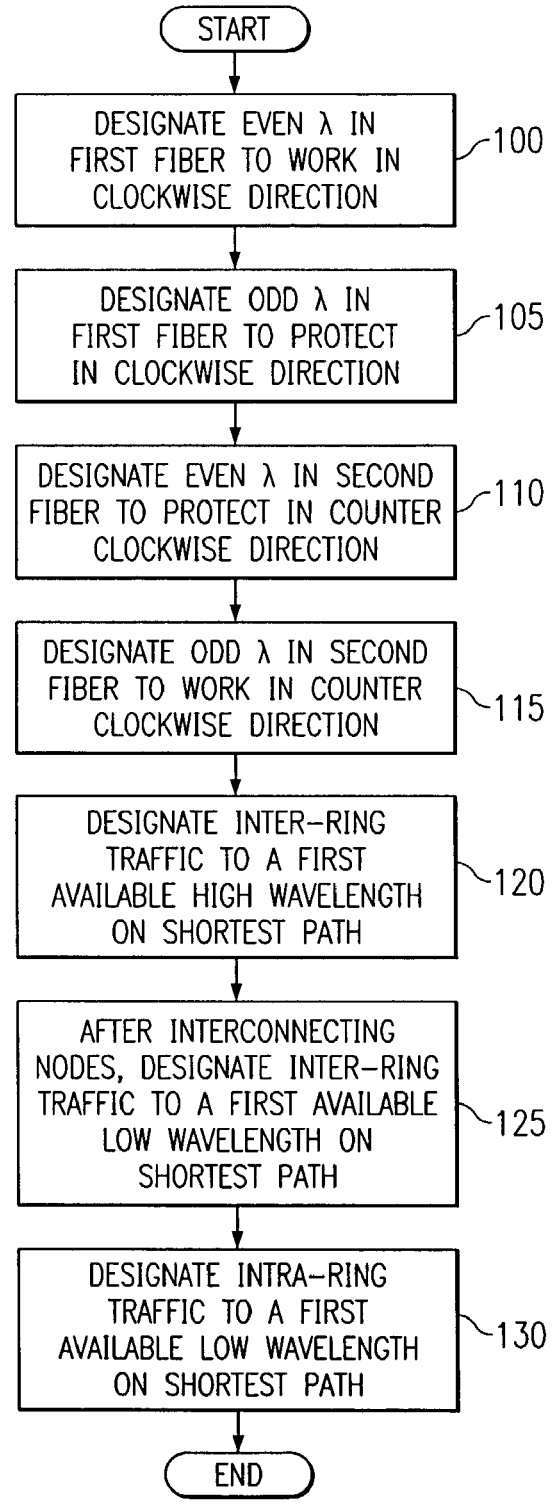
FIG. 4 is a flow diagram illustrating a method for allocating wavelengths in an optical network in accordance with one embodiment of the present invention.

FIG. 4 is a flow diagram illustrating a method for configuring wavelength assignment in an optical system, in accordance with one embodiment of the present invention. The method begins at step 100 wherein even wavelengths in a first clockwise fiber are designated to work. Next, at step 105, odd wavelengths in the first clockwise fiber are designated to protect.

At step 110, even wavelengths in a second counterclockwise fiber are designated to protect. Next, at step 115, odd wavelengths in the second counterclockwise fiber are designated to work. In this way, each transponder that covers more than one wavelength has access to a shortest path in each fiber. Steps 100 through 115 may be performed by NMS 44 or by other suitable network elements. NMS 44, or other controller, may be programmed to perform steps 100 through 115 and/or other actions by itself performing the action or by initiating other elements to perform the action, or by otherwise directing performance of the action.

At next step 120, inter-ring traffic is designated to a first available high wavelength on shortest path. At step 125, after the interconnecting node, inter-ring traffic is designated to a first available low wavelength on shortest path. At step 130, intra-ring traffic is designated to a first available low wavelength on shortest path and the process ends. In this way, each node has equal access to both a clockwise (CW) and a counterclockwise (CCW) transport directions of the ring, enabling the lightpath formed to be the shortest in distance and reducing the overall link-utilization ratio, thereby also reducing congestion.

FIG. 5 is a flow diagram illustrating a method for assigning a traffic channel to a wavelength in a multi-ring optical network. In this embodiment the multi-ring optical network includes bifurcated work and protect wavelengths. The process begins at step 200, wherein a shortest path is determined for the traffic channel. The shortest path may be determined by any number of algorithms, including open shortest path first (OSPF). Next, at step 205, a transport direction for the traffic channel is determined. The transport direction for the traffic channel may be based on the shortest path, as determined in step 200. In the event of a fiber cut, only one path may be available which would be or become shortest path.

At step 210, an inter/intra ring type is determined. That is, at this step it is determined whether the traffic channel will remain within a single ring or will travel along more than one ring. This may be performed by examining the identifier (ID) of the ingress node and egress node in optical communication system 10. If the nodes are in different rings, the traffic is inter-ring; if the nodes are in the same ring, the traffic is intra-ring.

Next, at step 215, the traffic channel is assigned to an available wavelength based on the transport direction determined at step 205 and the inter/intra ring type determined at step 210. In an exemplary embodiment, at step 215, the traffic channel is assigned to one of an odd and even wavelength based on the traffic direction. In another exemplary embodiment, the traffic channel is assigned to one of a high and low wavelength based on the inter/intra ring type. Thus, for example intra-ring traffic with a clockwise transport direction may be assigned to a lowest available odd wavelength; intra-ring traffic with a counterclockwise transport direction may be assigned to a lowest available even wavelength; inter-ring traffic with a clockwise transport direction may be assigned to a highest available odd wavelength; and inter-ring traffic with a counterclockwise transport direction may be assigned to a highest available even wavelength.

Next, at step 220, a transponder at an ingress node is tuned to the wavelength selected and/or assigned at step 215. At decisional step 225 if the traffic is not inter-ring traffic, the process continues along the No branch to step 230 where a transponder/receiver at an egress node is tuned to the wavelength selected at step 215. Next, at step 235, the traffic is transmitted and the process ends.

Returning to decisional step 225, if the traffic is inter-ring traffic, the process continues along the Yes branch to step 240. At step 240, the traffic channel is assigned to an available wavelength in the egress ring based on the transport direction in that ring and an intra-ring type relative to the egress ring. At step 245, a transponder at the interconnecting node is tuned to receive a traffic channel on the wavelength assigned in the ingress ring and to transmit a traffic channel on the wavelength assigned in the egress ring. Next, at step 250, the transponder at the egress node is tuned to the wavelength assigned in the ingress ring. Step 250 leads to step 235 where the traffic is transmitted and the process ends.

In an illustrative embodiment, the traffic channel may be an inter-ring traffic channel, wherein the wavelength to which the traffic channel is assigned is changed at a node interconnecting a first ring with a second ring into which the inter-ring traffic channel is routed. In still another embodiment, the traffic channel is assigned to one of an odd and even available wavelength based on a work-protect type of the traffic channel and a shortest path of the traffic channel.

Although the methods of FIGS. 4 and 5 have been shown with specific steps in a specific order, it will be understood that the steps may be performed in a different order as appropriate and other steps may be, added or omitted as appropriate in keeping with the spirit of the present invention.

Figure 6A:
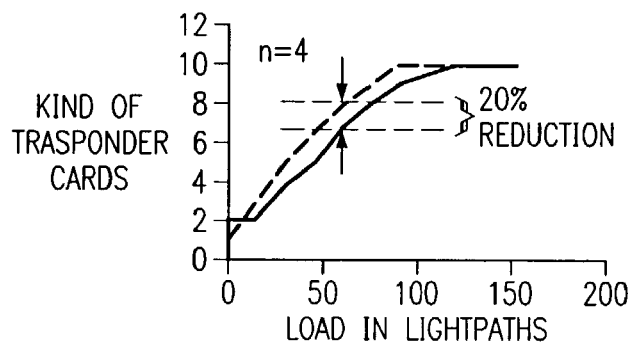
FIGS. 6A–C illustrate performance characteristics of an optical network configured with bifurcated traffic and channel assignment in accordance with one embodiment of the present invention.
Figure 6B:
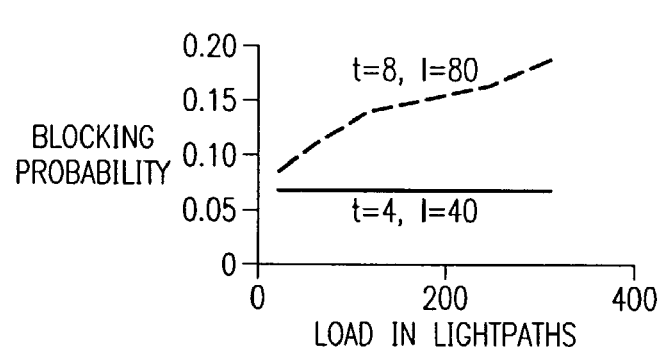
Figure 6C:
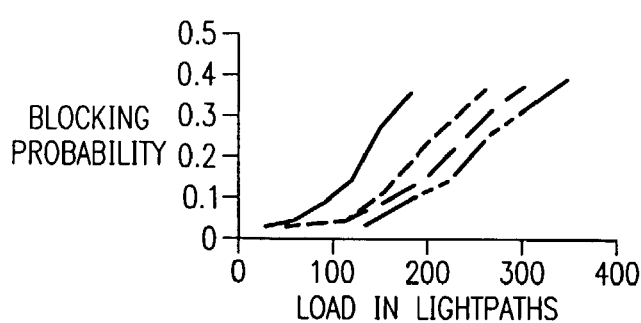

FIGS. 6A–C illustrate performance characteristics of an exemplary network utilizing a bifurcated wavelength and traffic assignment system, based on assigning wavelengths and calculating the different types of transponders needed for a particular traffic demand, as well as the associated throughput and blocking probability. The set of free wavelengths per optical link is determined and the next available ascending or descending wavelength is allocated to the new lightpath request depending on the type of traffic. In an initial state the traffic is clustered into two bands for inter-ring and intra-ring traffic demands. As the load increases, the employed wavelengths gradually approach each other and finally meet, covering the entire operating band of available wavelengths. Therefore, the theoretical maximum load limit for a two ring n-node system is $(\frac{2}{3}*n*\lambda_{max})/a$, where "a" is the average hop distance for uniform traffic (that is the distance between nodes) and $\lambda_{max}$ is the total number of wavelengths. Accordingly, the bifurcated scheme incorporates features of wavelength reuse based on spatial separation and shortest path routing may be incorporated into the network configuration.

Referring to FIG. 6A, performance data is shown for an inter-connected ring for uniform and random traffic demands over a number of nodes in each ring ranging from three to ten. Also shown are the kind of cards needed for a particular load as compared to a standard best-fit scheme. As illustrated, in the best-fit scenario, traffic was routed on shortest paths, and wavelengths were assigned in a heuristic manner, maximizing a network metric, such as throughput, without load balancing. As illustrated, for moderately heavy loads (between 50 and 100 lightpaths) the invention's employment of bifurcated wavelengths and traffic assignment results in a decrease of up to twenty percent of the total kinds of cards in the entire optical network. As shown, the disclosed bifurcated approach begins to out perform the best-fit model after a particular "cut in" point. In the exemplary 40 channel 4-wavelength tunable laser, this "cut in" occurs after the utilization of two kinds of cards. As illustrated, for greater than two kinds of cards, the kind of cards required is less than the best-fit approach. As the network saturates with traffic, the bifurcated scheme illustrated and the best-fit schemes exhaust the kind of cards at approximately fifty percent network utilization and stabilize with the full set of cards, in this case approximately ten kinds of transponder cards.

Referring now to FIG. 6B, performance data is shown for transponder cards with tunabilities of eight wavelengths as compared to four wavelengths. For uniform traffic growth, as illustrated, a corresponding uniform increase in tunability results in a constant blocking probability. This result illustrates an advantage of the bifurcation assignment scheme is that it performs one of the functions of load balancing. That is, as the bifurcation approach assigns the next available wavelength in ascending or descending order, the tunability for average loaded networks does not change. Thus, under the assignment scheme, a tunability rule for networks in terms of transponder cards may be approximated. For example, for an optimized stock of transponder cards, with $\lambda_{max}$ number of wavelengths, the optimal design includes transponders whose tunability is $\lambda_{max}/10$, assuming a centralized routing scheme to deal with the arrival rate of traffic demands uniformly.

Referring now to FIG. 6C, the performance characteristics of an optimal network employing the bifurcation scheme is illustrated by comparing the average blocking probability to the number of lightpaths established (throughput) for a variety of configurations with different numbers of network nodes. As illustrated, where the network is configured with a lower number of nodes (e.g., three nodes) the blocking probability curve is steeper and reaches a higher blocking probability at a lower number of lightpaths than achieved where the network includes a higher number of nodes (e.g., six nodes). Thus, the bifurcated traffic assignment scheme allows prediction of how many transponder cards and which type of cards are needed to be placed at a common node for a given maximum traffic requirement. Moreover, as illustrated the blocking probability of a lightpath for a given load which does not exceed the working load limit of the ring, is less than 0.1. Thus, the bifurcated assignment scheme allows predicting the number and type of transponder cards needed to establish lightpaths for a given quantity of inter-ring and intra-ring traffic irrespective of whether the traffic is uniformly distributed or partisan, including predicting the number and kind of transponder cards at ingress intermediate and egress nodes for a bounded traffic requirement. Various embodiments may include all, additional, some or none of the described advantage.

Although the present invention has been described with several embodiments, various changes and modifications may be suggested to one skilled in the art. It is intended that the present invention encompass such changes and modifications as fall within the scope of the appended claims.

What is claimed is:

1. A method for assigning a traffic channel to a wavelength in a multi-ring interconnected optical network, comprising:
   determining a transport direction for a traffic channel in a ring of a multi-ring optical network having bifurcated work and protect wavelengths;
   determining a work/protect type of the traffic channel;
   determining an inter/intra ring type of the traffic channel;
   assigning the traffic channel to one of an odd and even available wavelength based on the work/protect type of the traffic channel and the transport direction of the traffic channel; and
   assigning the traffic channel to one of a high and low available traffic channel based on the inter/intra ring type of the traffic channels;
   wherein when the traffic channel is a work channel, the method further comprises:
      assigning the traffic channel to a lowest available odd wavelength in response to at least determining the traffic channel comprises intra-ring traffic with a clockwise transport direction;
      assigning the traffic channel to a lowest available even wavelength in response to at least determining the traffic channel comprises intra-ring traffic with a counterclockwise transport direction;
      assigning the traffic channel to a highest available odd wavelength in response to at least determining the traffic channel comprises inter-ring traffic with a clockwise transport direction; and
      assigning the traffic channel to a highest available even wavelength in response to at least determining the traffic channel comprises inter-ring traffic with a counterclockwise transport direction.

2. The method of claim 1, further comprising assigning a transport card at an ingress node of the traffic channel in the ring based on the assigned wavelength, the transport card operable to transmit the traffic channel at the assigned wavelength.

3. The method of claim 1, wherein the traffic channel is an inter-ring traffic channel, further comprising changing the wavelength for the inter-ring traffic channel at a node connecting the ring to a second ring into which the inter-ring traffic channel is routed.

4. The method of claim 1, further comprising determining the transport direction based on a shortest path for the traffic channel.

5. A system for assigning a traffic channel to a wavelength in a multi-ring interconnected optical network, comprising:
   means for determining a transport direction for a traffic channel in a ring of a multi-ring optical network having bifurcated work and protect wavelengths;
   means for determining a work/protect type of the traffic channel;
   means for determining an inter/intra ring type of the traffic channel;
   means for assigning the traffic channel to one of an odd and even available wavelength based on the work/protect type of the traffic channel and the transport direction of the traffic channel;
   means for assigning the traffic channel to one of a high and low available wavelength based on the inter/intra ring type of the traffic channel;
   means for assigning the traffic channel to a lowest available odd wavelength in response to at least determining the traffic channel comprises intra-ring traffic with a clockwise transport direction;
   means for assigning the traffic channel to a lowest available even wavelength in response to at least determining the traffic channel intra-ring traffic with a counterclockwise transport direction;
   means for assigning the traffic channel to a highest available odd wavelength in response to at least determining the traffic channel inter-ring traffic with a clockwise transport direction; and
   means for assigning the traffic channel to a highest available even wavelength in response to at least determining the traffic channel inter-ring traffic with a counterclockwise transport direction.

6. The system of claim 5, further comprising means for assigning a transport card at an ingress node of the traffic channel into the ring based on the assigned wavelength, the transport card operable to transmit the traffic channel at the assigned wavelength.

7. The system of claim 5, wherein the traffic channel is an inter-ring traffic channel, further comprising means for changing the wavelength for the inter-ring traffic channel at a node connecting the ring to a second ring into which the inter-ring traffic channel is routed.

8. The system of claim 5, further comprising means for determining the transport direction based on a shortest path for the traffic channel.

9. A system for assigning a traffic channel to a wavelength in a multi-ring interconnected optical network, comprising:
   logic encoded on media; and
   the logic operable to determine a transport direction for a traffic channel in a ring of a multi-ring optical network having bifurcated work and protect wavelengths, determine a work/protect type of the traffic channel, determine an inter/intra ring type of the traffic channel, assign the traffic channel to one of an odd and even available wavelength based on the work/protect type of the traffic channel and the transport direction of the traffic channel, and assign the traffic channel to one of a high and low available wavelength based on the inter/intra ring type of the traffic channel;
wherein the logic further is operable to:
  assign the traffic channel to a lowest available odd wavelength in response to at least determining the traffic channel comprises intra-ring traffic with a clockwise transport direction;
  assign the traffic channel to a lowest available even wavelength in response to at least determining the traffic channel comprises intra-ring traffic with a counterclockwise transport direction;
  assign the traffic channel to a highest available odd wavelength in response to at least determining the traffic channel comprises inter-ring traffic with a clockwise transport direction; and
  assign the traffic channel to a highest available even wavelength in response to at least determining the traffic channel comprises inter-ring traffic with a counterclockwise transport direction.

10. The system of claim 9, the logic further operable to assign a transport card at an ingress node of the traffic channel into the ring based on the assigned wavelength, the transport card operable to transmit the traffic channel at the assigned wavelength.

11. The system of claim 9, wherein the traffic channel is an inter-ring traffic channel, the logic further operable to change the wavelength for the inter-ring traffic channel at a node connecting the ring to a second ring into which the inter-ring traffic channel is routed.

12. The system of claim 9, the logic further operable to determine the transport direction based on a shortest path for the traffic channel.

* * * * *